United States Patent [19]

McMahon

[11] 4,432,599
[45] Feb. 21, 1984

[54] FIBER OPTIC DIFFERENTIAL SENSOR

[75] Inventor: Donald H. McMahon, Carlisle, Mass.

[73] Assignee: Sperry Corporation, New York, N.Y.

[21] Appl. No.: 248,615

[22] Filed: Mar. 27, 1981

[51] Int. Cl.³ .............................................. G02B 5/16
[52] U.S. Cl. ............................... 350/96.15; 250/227; 370/4
[58] Field of Search .............. 250/227, 231 P, 231 R, 250/231 GY, 231 SE; 350/96.15, 96.20, 96.29; 370/4

[56] References Cited

U.S. PATENT DOCUMENTS

| | | | |
|---|---|---|---|
| 3,403,263 | 9/1968 | Hargens | 250/227 |
| 3,961,185 | 6/1976 | Brokenshire et al. | 250/227 |
| 4,117,460 | 9/1978 | Walworth et al. | 250/227 |
| 4,136,566 | 1/1979 | Christensen | 250/227 |
| 4,164,373 | 8/1979 | Schuss et al. | 250/227 |
| 4,245,886 | 1/1981 | Kolodzey et al. | 350/96.20 |
| 4,249,076 | 2/1981 | Bergstrom et al. | 250/227 |
| 4,255,754 | 3/1981 | Crean et al. | 250/227 |
| 4,281,245 | 7/1981 | Brogardh et al. | 250/227 |
| 4,291,976 | 9/1981 | McMahon | 250/227 |
| 4,293,188 | 10/1981 | McMahon | 350/96.29 |
| 4,300,813 | 11/1981 | Gravel | 350/96.10 |
| 4,302,835 | 11/1981 | McMahon | 370/4 |
| 4,303,302 | 12/1981 | Ramsey et al. | 350/96.15 |
| 4,304,460 | 12/1981 | Tanaka et al. | 350/96.20 |
| 4,327,362 | 4/1982 | Hoss | 250/231 SE |
| 4,356,395 | 10/1982 | Miller | 250/227 |
| 4,358,960 | 11/1982 | Porter | 250/227 X |

FOREIGN PATENT DOCUMENTS 55-88030  7/1980  Japan ................. 350/96.15

OTHER PUBLICATIONS

Nelson et al., *Applied Optics*, vol. 19, No. 17, Sep. 1, 1980, pp. 2917-2920, "Passive Multiplexing System for Fiber-Optic Sensors".

*Primary Examiner*—John D. Lee
*Assistant Examiner*—Frank Gonzalez
*Attorney, Agent, or Firm*—Howard P. Terry; Seymour Levine

[57] ABSTRACT

An optical differential sensor utilizes at least two optical waveguides to receive light directly from another waveguide or reflected from a mirror to sense the position of the waveguide or reflector relative to the position of at least two waveguides. Relative positions may be influenced by ambient conditions or from mechanical motions, thus affecting an environmental or metrical sensor.

7 Claims, 10 Drawing Figures

FIBER OPTIC DIFFERENTIAL SENSOR

BACKGROUND OF THE INVENTION

1. Field of the Invention

The present invention relates to environmental and metric sensors and more particularly to environmental and metric sensors wherein light signals in a multiplicity of optical fibers are modified, with the utilization of environmental and positional sensitive elements, in accordance with environmental and positional variations.

2. Description of the Prior Art

Fiber optic transducers of the prior art generally utilize a membrane, movable with ambient variations. This membrane may be coupled to at least one of two optical fibers, having opposing end faces across a gap that are movable therewith to effectuate a variation of the coupling of light propagating across the gap between the end faces of the optical fibers. One such device is disclosed in U.S. patent application Ser. No. 71,893, now U.S. Pat. No. 4,300,813, filed Sept. 4, 1979 by R. L. Gravel and assigned to the assignee of the present invention. This device includes two optical fibers, each cut to have end faces substantially perpendicular to an axis and positioned with a small gap between the end faces of the fibers. One fiber is mounted to maintain its end face stationary, while the other is cantilevered and coupled to a membrane movable with variations in ambient pressure, thus effectuating a relative movement of the optical fibers and a variation of the coefficient of coupling optical energy therebetween.

A fiber optic transducer which provides improved sensitivity over that of the Gravel device is disclosed by D. H. McMahon in U.S. patent application Ser. No. 133,171, now U.S. Pat. No. 4,293,188, filed Mar. 19, 1980 and assigned to the assignee of the present invention. As in the Gravel device, the transducer disclosed by McMahon comprises a first optical fiber disposed with its end face stationary while the second optical fiber is coupled to a membrane movable with variations in ambient pressure and disposed so that its free end may be laterally displaced from the axis of the first optical fiber in accordance with the movement of the membrane. The sensitivity of the transducer is enhanced through the use of large core, large numerical aperture, multimode optical fibers. The opposed faces of the cooperating fibers are equipped with or used to illuminate regular arrays of equally spaced opaque, absorptive, or reflective grating systems providing intensity or phase modulation of the propagating light energy in proportion to the optical fiber deflection. Another transducer of the prior art for converting variations in ambient pressure to intensity modulated optical signals is disclosed in U.S. patent application Ser. No. 63,504, now abandoned, filed Aug. 3, 1979 by D. H. McMahon and assigned to the assignee of the present invention. This transducer is provided by cutting and polishing the ends of two optical fibers, having equal indices of refraction, at predetermined angles with respect to their axes and positioning the angled end faces in parallel relationship a distance apart that is less than the wavelength of the light propagating within the input fiber, thus creating a gap between the end faces wherein a material with a second refractive index is contained. The angled end faces are held in position by two plates through which the fibers extend, and are coupled to pressure sensing elements of the system. Variations in pressure cause the distance between the end faces of the fibers to vary producing variations in the optical signal energy coupled between the optical fibers thus creating an amplitude modulated light beam at the output port of the system.

The transducers of the prior art, described above, are capable of converting motions in the order of $10^{-10}$ cm to measurable and identifiable optical signal modulations. These, however, are absolute measurements, the accuracy of which is a function of the optical source stability. Additionally, to achieve the above-quoted accuracy, difficult and time consuming procedures must be employed to calibrate the system.

SUMMARY OF THE INVENTION

A fiber optic differential sensor in accordance with the present invention may comprise a movable optical fiber with its end face positioned opposite the end faces of a multiplicity of mutually adjacent fixed optical fibers. The axes of the movable optical fiber and the fixed optical fiber are located such that, with the movable optical fiber in its initial position, optical signals propagating therein couple optical signals of substantially equal intensity through the end faces to each of the fixed optical fibers. This optical energy balance is upset when a sensor mechanism, coupled to the movable optical fiber, causes a small displacement of the axis thereof. Small displacements of the movable optical fiber cause the optical energy distribution between the fixed optical fibers to vary substantially linearly with the positional shift of the movable optical fiber. The energy altered signals in the fixed optical signals are converted into corresponding electrical signals by optical detectors which in turn may be coupled to sum and difference amplifiers to obtain appropriate signal sums and differences that may be utilized to establish the total displacement of the movable optical fiber axis.

DESCRIPTION OF THE PREFERRED EMBODIMENTS

Figure 1:
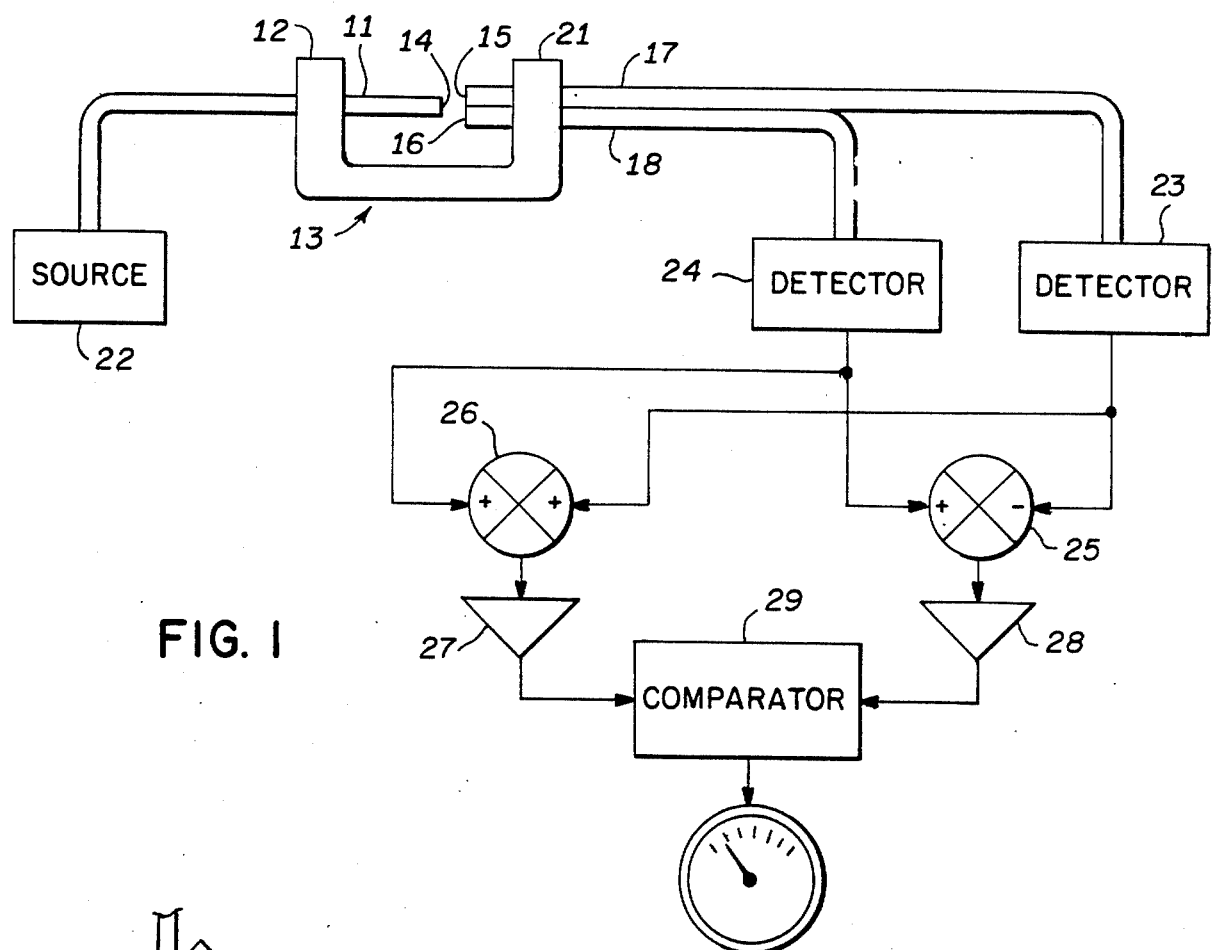
FIG. 1 is a schematic diagram, partially in block form, of an embodiment of the invention.

Referring now to FIG. 1, there is illustrated an embodiment of the invention wherein a movable optical fiber 11 extending through the wall 12 of housing 13 is positioned such that its end face 14 is located opposite and substantially parallel to the end faces 15 and 16 of optical fibers 17 and 18, respectively, extending through and held immovable by the wall 21 of housing 13. In practice, the movable fiber 11 may be coupled to an ambient condition sensor, as for example, a diaphragm (not shown) movable with variations in ambient pressure. The longitudinal axis of the optical fiber 11 is positioned relative to the longitudinal axes of the optical fibers 17 and 18 such that, for a reference ambient condition, light incident to the optical fiber 11 from a source 22 is coupled from the end face 14 through the end faces 15 and 16 with equal intensities to the optical fibers 17 and 18. Variations in the ambient condition cause the longitudinal axis of the optical fiber 11 to be deflected in accordance therewith thereby disturbing the equal intensity coupling of light from optical fiber 11 to optical fibers 17 and 18 thus resulting in an unbalance of light energy in the two fixed optical fibers, this unbalance being a measure of the variation in the ambient condition from the reference value. Light signals propagating in optical fibers 17 and 18 are incident to detectors 23 and 24 wherefrom electrical signals representative of the intensity of the detected light are coupled to difference circuit 25 and sum circuit 26. The sum and difference of the intensity representative electrical signals are coupled from the sum circuit 26 and the difference circuit 25 through amplifiers 27 and 28 to comparator 29 wherein the ratio of the difference signal to the sum signal is obtained. This ratio is representative of the variation of the ambient condition from the reference value and is substantially independent of the source 22 stability.

Figure 2:
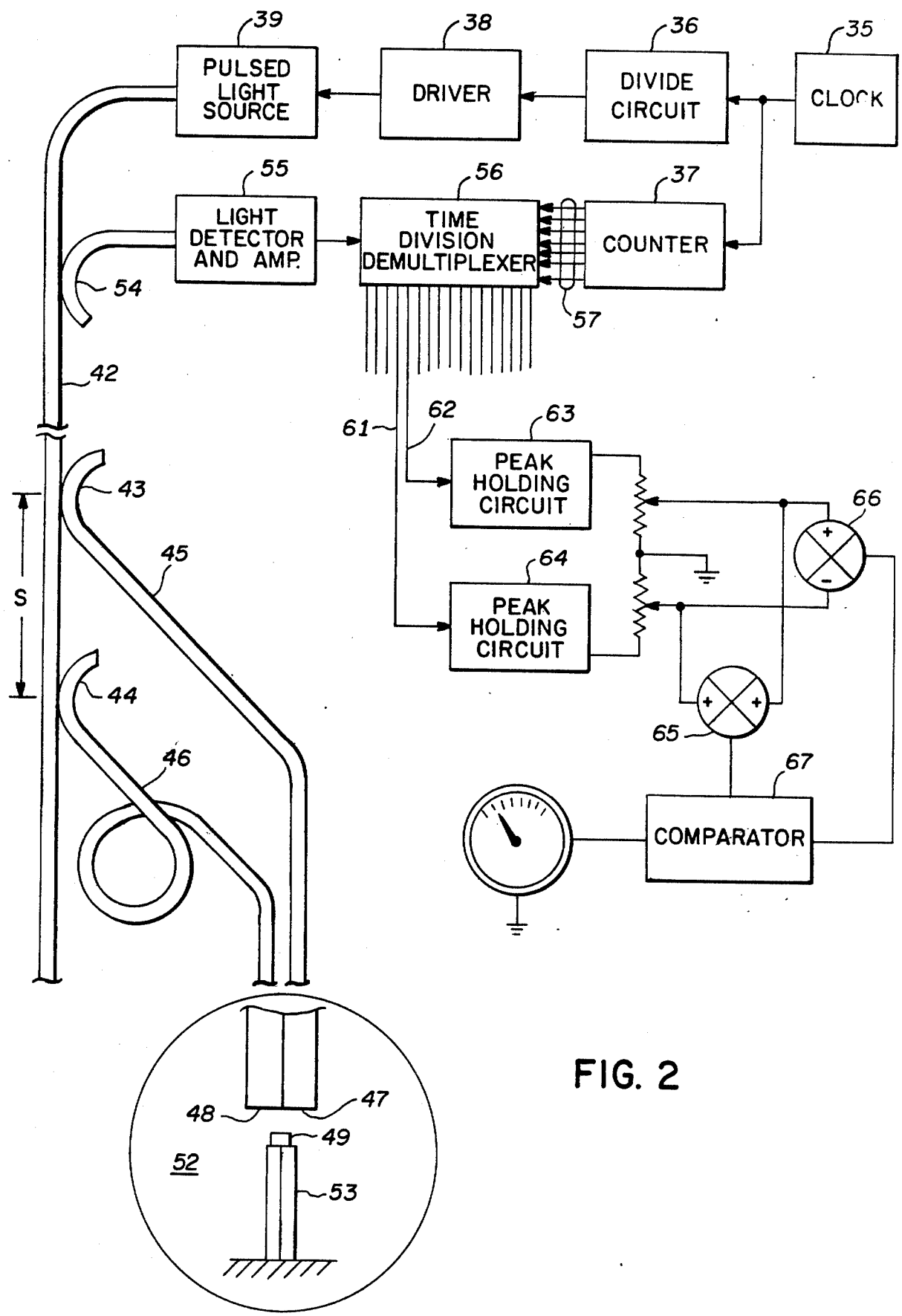
FIG. 2 is a schematic diagram, partially in block form, of an embodiment of the invention utilizing passive time division multiplexing.

FIG. 2 is an illustration of an embodiment of the invention wherein incident light is reflected from a mirror movable in accordance with variations in ambient conditions. Time division multiplexing is employed to separate the multiplicity of reflected signals and permit the utilization of a single optical fiber to couple these reflected signals to a light detector. A clock 35 which, for example, may operate at a 100 MHz rate, is coupled to divide circuit 36 and counter 37. Divide circuit 36 may coupled one pulse to driver 38 after each 100 pulses received from clock 365. With each pulse received from divide circuit 36, driver 38 couples an activating signal to light source 39, which as a result thereof may generate a light pulse of short duration, as for example, 4 ns duration. This pulsed light is coupled to optical fiber 42 from which pulsed light of equal peak intensity is coupled to the end faces 47 and 48 of equal length optical fibers 45 and 46 via directional couplers 43 and 44, spaced a distance "s" apart which may be one meter. To effectuate a temperature sensor, a mirror 49 may be coupled to a bimetallic strip 53 and positioned opposite the end faces 47 and 48 to reflect portions of the light incident thereto to the optical fibers 45 and 46 through the end faces 47 and 48, as shown in the blowup 52. For a given reference temperature, the end faces 47 and 48 and the mirror 49 are positioned such that light incident to the mirror is reflected through the end faces 47 and 48 with equal intensity. As the temperature changes from this reference value, the bimetallic strip 53 bends in accordance therewith causing the light reflected from the mirror to couple unequally to the optical fibers 45 and 46. The reflected light pulses in each optical fiber 44 and 45 are coupled to optical fiber 42 with a time interval therebetween equal to 2 s/c, which may be substantially 10 ns. These light pulses are then coupled via directional coupler 54 to light detector and amplifier 55 from which electrical pulses representative of the incident light pulses are coupled to a time division multiplexer 56.

Coded signals are coupled from counter 37, via lines 57, to time division multiplexer 56 to sequentially couple the electrical pulses from light detector and amplifier 55 to each of the output terminals of time division multiplexer 56. If a series of directional couplers spaced one meter apart couple a multiplicity of sensors to optical fiber 42 via optical fibers of lengths equal to the length of optical fibers 45 and 46, optical pulses are returned from all the sensors of the system within one microsecond. In this arrangement, 100 output terminals may be realized for time division multiplexer 56 of which a selected pair 61 and 62 receive electrical pulses representative of the optical pulses reflected from the end faces 47 and 48. These electrical pulses may be coupled to peak holding circuits 63 and 64, each having a time constant long compared with the pulse repetition rate of the light source. The output signals from the peak holding circuits 63 and 64 may be coupled to sum and difference circuits 65, 66, the output signals of which are coupled to a comparator 67 for the determination of the ratio of the sum to the difference to derive a signal representative of the ambient temperature in a manner similar to that described with respect to FIG. 1.

Figure 3:
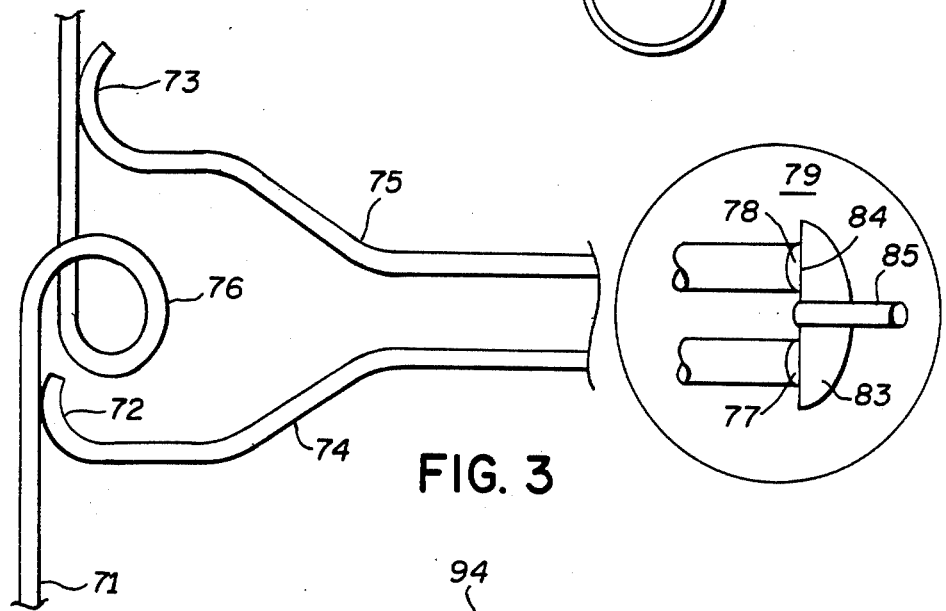
FIG. 3 is a schematic diagram showing two optical fibers cooperating with a rotating mirror to provide a structure useful for measuring small angle changes.

Refer now to FIG. 3 wherein a schematic diagram of a device employing the principles of the present invention for measuring small rotational angles is shown. Optical pulses incident from an optical fiber 71 are coupled via directional couplers 72 and 73 to optical fibers 74 and 75, respectively, with a delay therebetween corresponding to the length of fiber 76 between the directional couplers 72 and 73 as previously explained. This light is emitted from end faces 77 and 78, shown in the exploded view 79 to be incident upon a mirror 83, which may be semicircular with its diameter 84 forming the edge thereof positioned substantially coincident with the diameter of a shaft 85, the rotation of which is to be determined. The shaft and mirror combination are positioned with the longitudinal axis of the shaft substantially equidistant from the centers of the end faces 77 and 78. When the shaft 85 is in its initial angular position, the edge 84 of the mirror 83 is aligned substantially with the diameters of the end faces 77 and 78 thereby intercepting and reflecting equal light intensities emitted from the end faces. A rotation of the shaft 85 causes the mirror 83 to intercept and reflect a greater portion of the light emitted from one end face than from the other, as for example, a counterclockwise rotation of the shaft 85 will cause a greater light intensity to be reflected towards end face 78 than towards end face 77. The differential of reflected light intensity may then be determined as previously described with reference to FIGS. 1 and 2.

Figure 4:
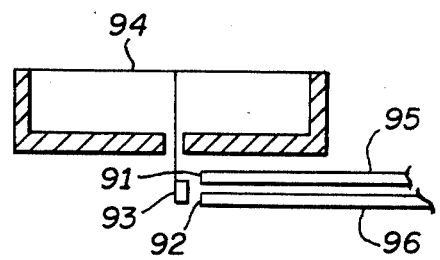
FIG. 4 is a schematic diagram indicating two optical fibers cooperating with a pressure sensitive diaphragm in an arrangement, useful with the principles of the invention, for providing a sensor for measuring small changes in pressure.
Figure 5:
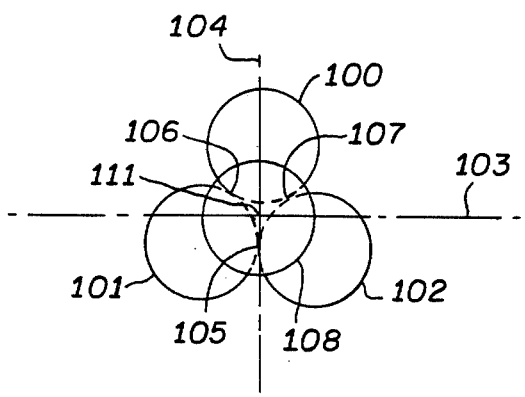
FIGS. 5, 6 and 7 are end views of optical fiber positionings useful in the embodiments of FIGS. 1 and 2.
Figure 6:
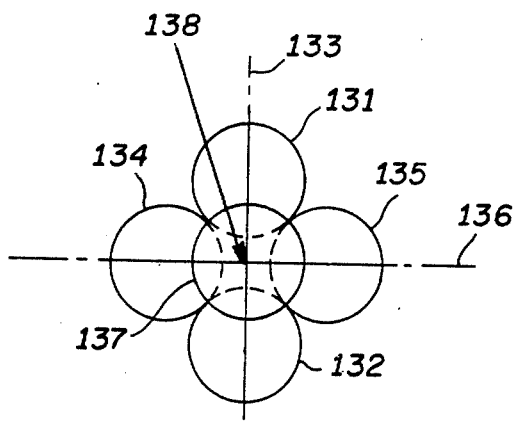
Figure 7:
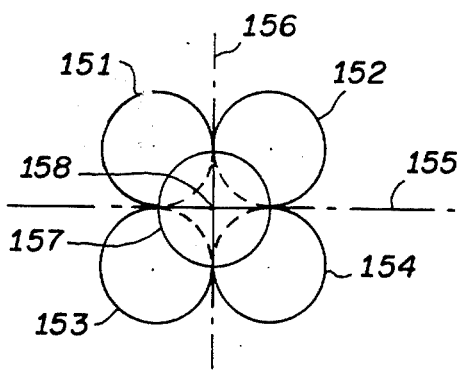

An arrangement of optical fibers and mirror for measuring small pressure differentials utilizing the principles of the present invention is shown schematically in FIG. 4. Pulse optical signals with time separations therebetween effected as previously described are emitted from end faces 91 and 92 to be partially incident to mirror 93. Mirror 93 is coupled to a diaphragm 94 which causes vertical displacement of the mirror 93 with variations in pressure. At a reference pressure, mirror 93 is positioned with respect to the end faces 91 and 92 to reflect light with equal intensities for coupling through end faces 91 and 92 to propagate in optical fibers 95 and 96, respectively. When the ambient pressure is greater than the aforementioned reference pressure, diaphragm 94 causes the mirror 95 to descend in a substantially vertical direction thereby intercepting and reflecting more light emitted from end face 92 than from end face 91. This causes a light pulse to propagate in optical fiber 96 that has a greater intensity than the light pulse that is caused to propagate in optical fiber 95. Conversely, ambient pressures below the aforementioned reference pressure cause the diaphragm 94 to flex in a manner that affects an upward movement of the mirror 93 thereby intercepting and reflecting more light from end face 91 than from end face 92, coupling a light pulse to optical fiber 95 that has a greater intensity than the light pulse coupled to optical fiber 96. The light pulses in optical fibers 95 and 96 are coupled to a demultiplexer and processed as previously described with respect to FIGS. 1 and 2 to determine the pressure variation from the reference. In FIGS. 5, 6 and 7, optical fiber end face arrangements opposite a mirror, that may be utilized to simultaneously sense positional displacement of the mirror in two orthogonal directions, are shown. Referring to FIG. 5, the end faces 100, 101 and 102 of three optical fibers are equiangularly positioned about a center 111 with the end face 100 entirely above the axis 103 with its diameter substantially parallel to the axis 104. End face 101 may be positioned to be tangent to axis 104 at a point 105 and tangent to end face 100 at a point 106, while end face 102 may be positioned to be tangent to axis 104 at point 105 and tangent to end face 100 at a point 107. When mirror 108 is located symmetrically about the origin 111 of the axes 103 and 104, light signals of equal intensity incident to the mirror 108 from each of the end faces 100, 101, and 102 will be reflected to couple light signals of equal intensity through the end faces 100, 101 and 102 to propagate along the corresponding optical fibers.

Figure 5A:
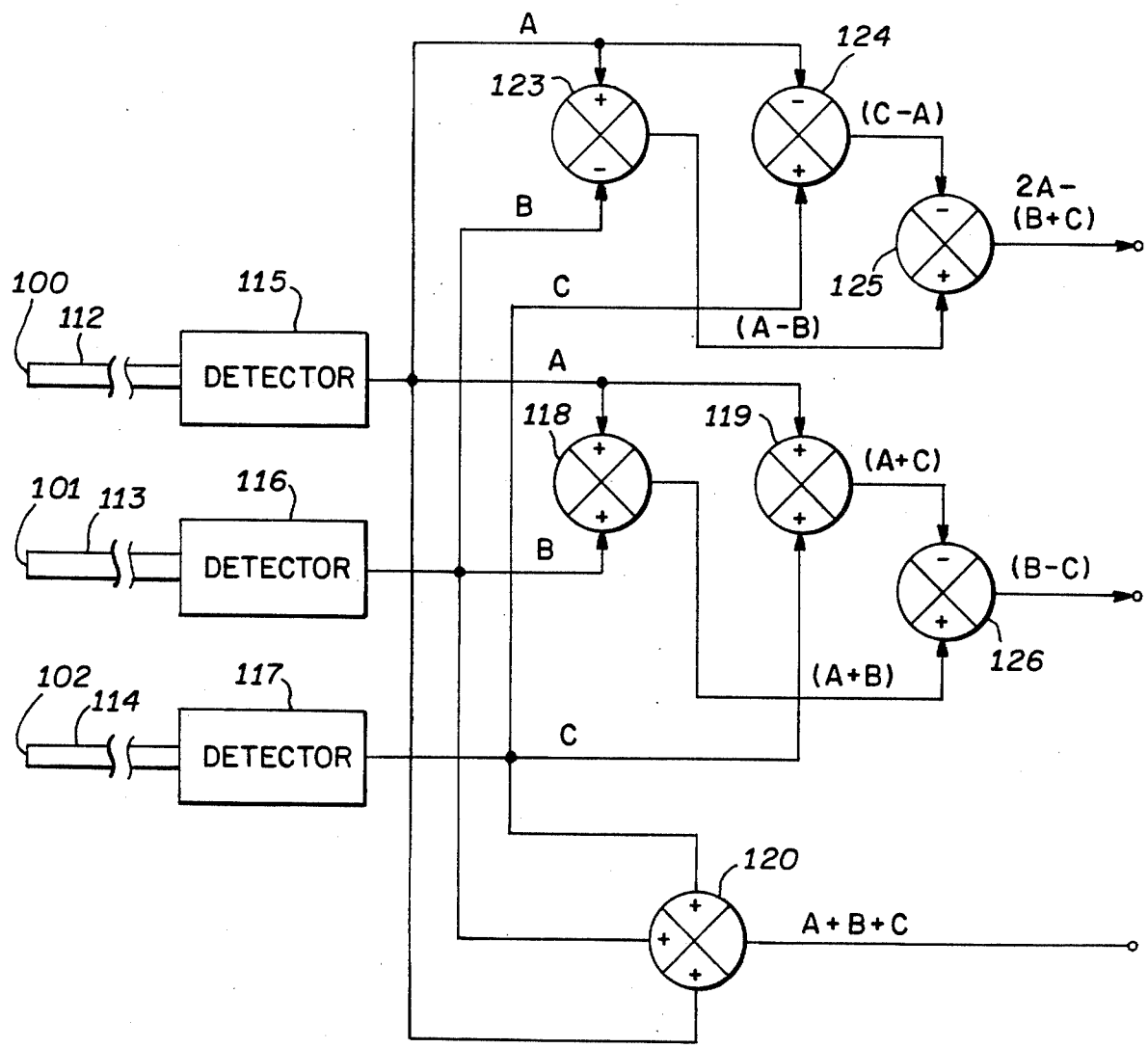
FIGS. 5A, 6A and 7A are schematic diagrams of circuits useful for processing light signals received by the optical fibers of FIGS. 5, 6 and 7, respectively.

Light reflected from the mirror 108, coupled via end faces 100, 101, 102 to propagate in optical fibers 112, 113, and 114, respectively, and, in a manner previously described with respect to FIGS. 1 and 2, are coupled to detectors 115, 116 and 117, shown in FIG. 5A. The output terminal of detector 115 is coupled to a positive input terminal of addition circuits 118, 119, and 120, to a positive input terminal of subtraction circuit 123, and to a negative input terminal of subtraction circuit 124. The output terminal of detector 116 is coupled to positive input terminals of addition circuits 118 and 120, and to the negative input terminal of subtraction circuit 123; while the output terminal of detector 117 is coupled to positive input terminals of addition networks 119 and 120, and to the positive input terminal of subtraction network 124. The output terminals of subtraction networks 123 and 124 are respectively coupled to the positive and negative input terminals of subtraction network 125 while the output terminals of the addition networks 118 and 119 are respectively coupled to the positive and negative input terminals of subtraction network 126. Designating the electrical signals at the output terminals of detectors 115, 116, and 117 as A, B, and C, respectively, it should be apparent that the output signals from the addition networks 118 and 119 are (A+B) and (A+C) resulting in an output signal from subtraction network 126 of (B−C) and output signals of subtraction networks 123 and 124 of (A−B) and (C−A), respectively, causing an output signal at the output terminal of subtraction network 125 of [2A−(B+C)]. Since the signals A, B, and C are added in addition network 120, the output signal therefrom is (A+B+C). The output signals from subtraction networks 125 and 126 and addition network 120 may be coupled to appropriate comparators for the derivation of signals representative of the two-dimensional offset position of the mirror 108 of FIG. 5.

It should be apparent to those skilled in the art that the axis of the three end faces 100, 101 and 102 may be rotated to other equiangular configurations of three fibers and with appropriate processing establish sensing system equivalent to that above discussed.

In FIG. 6, a four fiber configuration for sensing positional displacement in a two-dimensional system is shown. End faces 131 and 132 are positioned with their diameters substantially parallel to the axis 133 while end faces 134 and 135 are positioned with their diameters substantially parallel to the axis 136, thus equiangularly positioning the end faces about a center 138. A mirror 137 is positioned to reflect light, incident thereto with equal intensities from the end faces 133, 132,134, and 135, back to these end faces with equal intensities when its center is substantially coincident with the origin 138 of the two axis system. A displacement of the mirror from its initial position along the axis 133 causes the light reflected to the end face 131 to be of different intensity from the light reflected to the end face 132, while a displacement parallel to the axis 136 causes the light reflected to end face 134 to have an intensity that differs from that of the light reflected to the end face 135.

Figure 6A:
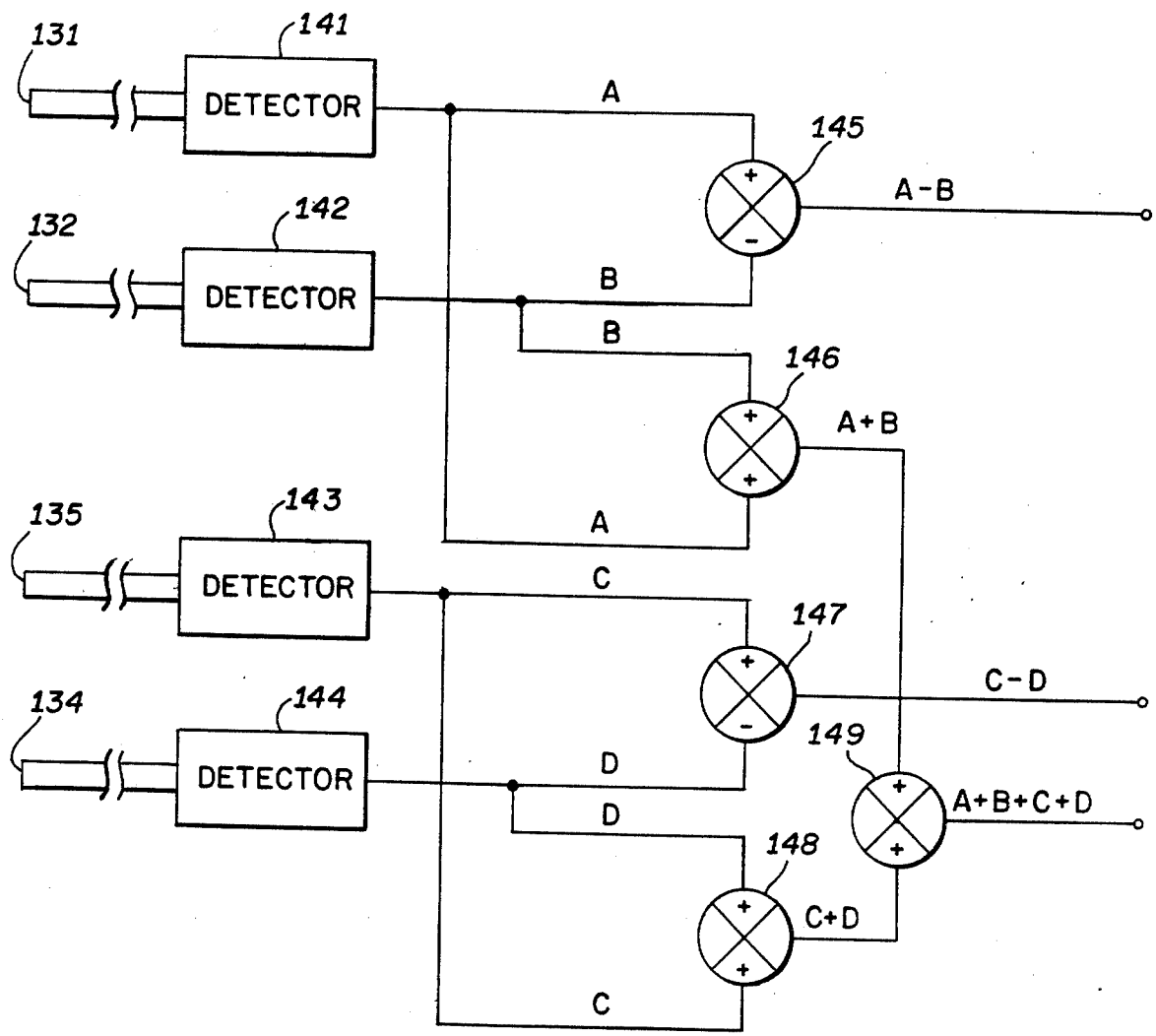

In FIG. 6A, a schematic diagram is shown for the derivation of signals representative of the two-dimensional displacement of the mirror 137. Detectors 141, 142, 143, and 144, respectively, are coupled to end faces 131, 132, 135, and 134 in a manner previously described. The electrical output terminal of detector 141 is coupled to a positive input terminal of a difference circuit 145 and to an input terminal of addition circuit 146, the electrical output terminal of detector 142 is coupled to a second input terminal of addition circuit 146 and to a negative terminal of subtraction network 145, the electrical output terminal of detector 143 is coupled to a positive input terminal of a subtraction network 147 and to an input terminal of addition network 148, while the electrical output terminal of detector 144 is coupled to the negative input terminal of subtraction network 147 and to a second input terminal of addition network 148. The output terminals of addition networks 146 and 148 are coupled to input terminals of an addition network 149. Designating A, B, C, and D as the electrical signals at the output terminals of detectors 141, 142, 143, and 144, respectively, it is apparent from the figure, that the signals at the output terminals of subtraction networks 145 and 147 are (A−B) and (C−D) and the electrical signal at the output terminal of the addition network 149 is (A+B+C+D). Thus, the electrical signal at the output of the difference amplifier is a function of the difference in the intensity of the light reflected to the end faces 133 and 132 and the electrical signal at the output of difference circuit 147 is representative of the difference in intensity of the light reflected to the end faces 135 and 134 while the electrical signal at the output terminals of additional circuit 149 is representative of the total light reflected to the optical fibers 131, 132, 134 and 135.

Figure 7A:
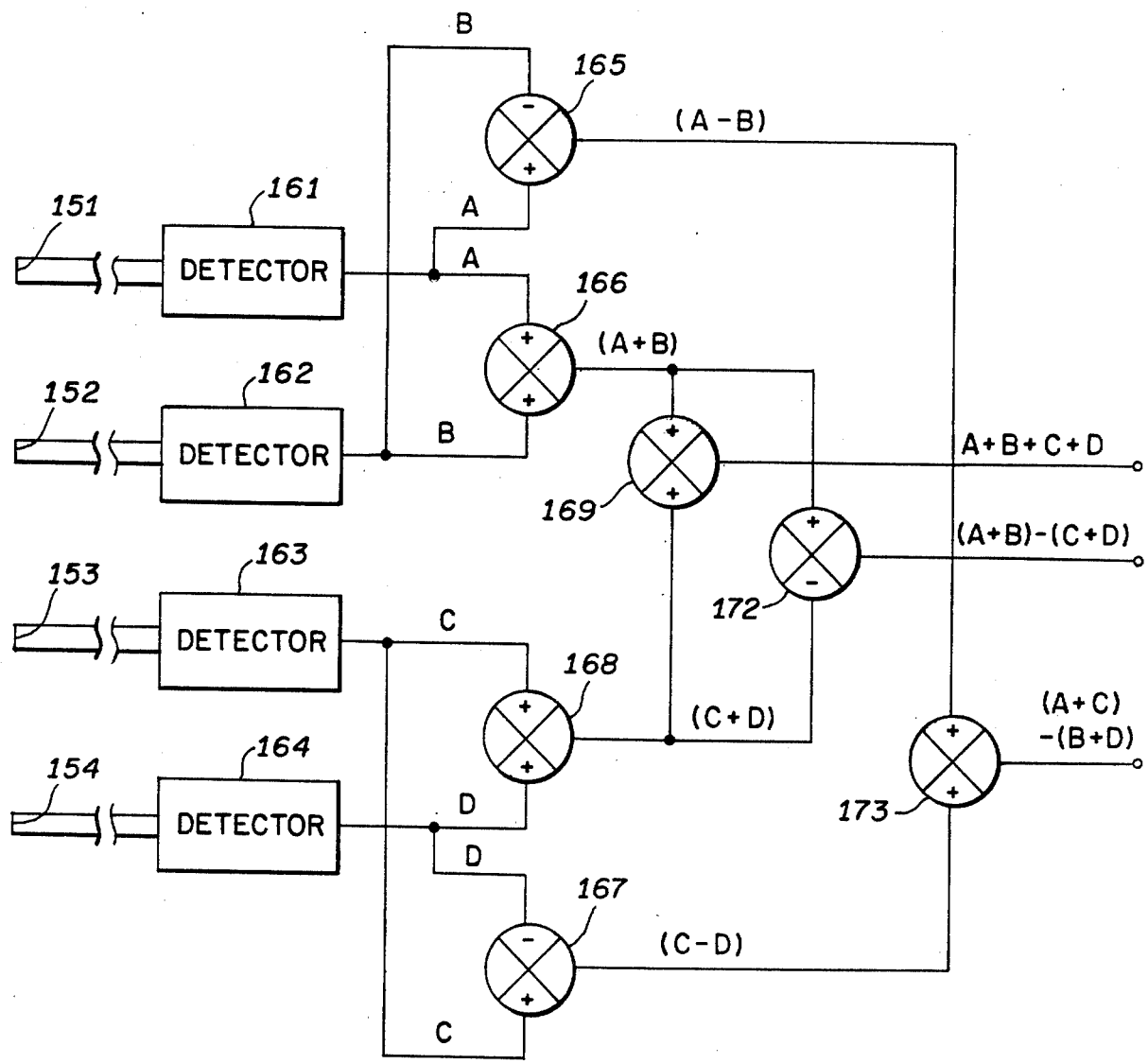

A second equiangular arrangement of four optical fiber end faces that may be utilized for sensing two-dimensional position displacement is shown in FIG. 7. Each of the four end faces 151,152, 153 and 154 are positioned in a quadrant of a two axis coordinate system having axes 155 and 156 with each of the end faces tangent to both axes. A circular mirror 157, illuminated with equal intensities from end faces 151 through 154, positioned with its center 158 substantially in line with the origin of the coordinate system determined by axis 155 and 156 will reflect light with equal intensity to each of the corresponding optical fibers. When the mirror is displaced along the axis 156, light will be reflected to the end faces 151 and 152 with equal intensity as will the light reflected to the end faces 153 and 154. The intensity of the light, however, reflected to the end faces 151 and 152 will differ from the intensity of the light reflected to end faces 153 and 154. Thus, by adding the intensities of the light reflected through the end faces 151 and 152 and subtracting it from the sum of the intensity of the light reflected to end faces 153 and 154, a measure of the displacement of the mirror may be determined. Similarly, displacement of the mirror 157 parallel to the axis 155 will cause the sum of the intensities of the light reflected to end faces 152 and 153 to differ from the sum of the intensities of the light reflected to end faces 151 and 154. The sum differences discussed above provide a measure of the displacement of the mirror 157 from its initial position. In FIG. 7A, a circuit is shown with which electrical signals may be derived that are representative of the displacement of the mirror parallel to the axes 155 and 156. Detectors 161 through 164 are coupled to end faces 151 through 154, respectively, in a manner previously discussed with reference to FIGS. 1 and 2 and provide electrical signals at the output terminals thereof that are representative of the intensity of the light reflected through the end faces 151 through 154. The output terminal of detector 161 is coupled to a sum terminal of a difference circuit 165 and to an input terminal of a sum circuit 166 while the output terminal of detector 162 is coupled to the difference terminal of difference circuit 165 and to a second input terminal of the sum circuit 166. Similarly, the output terminal of detector 163 is coupled to a sum terminal of a difference circuit 167 and to an input terminal of a sum circuit 168 while the output terminal of detector 164 is coupled to the difference terminal of difference network 167 and to a second input terminal of sum circuit 168. The output terminal of sum circuit 168 is coupled to an input terminal of a sum circuit 169 and to a difference terminal of difference circuit 172, while the output terminal of sum circuit 166 is coupled to the sum terminal of difference circuit 172 and to a second input terminal of sum circuit 169. The output terminals of difference circuits 165 and 167 are each coupled to the input terminals of the sum circuit 173. Designating A, B, C, and D as the signals representative of the light intensity reflected to end faces 150–154, respectively, it should be apparent that the signal at the output terminal of sum circuit 169 is representative of the total light intensity reflected to the end faces 151 through 154, that the signal at the output terminal of difference circuit 172 is representative of the difference between the sum of the intensity of light reflected to end faces 151 and 152 and the intensity of light reflected to end faces 153 and 154, while the signal at the output terminal of summation circuit 173 is representative of the difference between the sum of the intensities of the light reflected to end faces 151 and 153 and the sum of the intensities reflected to end faces 152 and 154. These sum and difference signals may be processed in a manner previously discussed to provide signals representative of the displacement of the mirror along the axes 155 and 156.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A fiber optic differential sensor comprising:
   main optical propagation means for propagating optical signals in first and second directions;
   a plurality of optical directional couplers coupled to said main optical propagation means with predetermined separations therebetween;
   a plurality of branch optical waveguides respectively coupled to said plurality of optical directional couplers to receive portions of optical signals propagating in said first direction, each having an end face with said end faces arranged in groups, each group having a center and at least two end faces positioned about said center;
   mirror means movable with variations in ambient conditions and positioned with respect to said groups of at least two end faces for reflecting at least portions of optical signals emitted from said at least two end faces back thereto for coupling therethrough to said directional couplers for propagation in said optical propagating means in said second direction, said portion of said reflected signal being a function of said positioning with respect to said at least two end faces and said optical signals propagating in said second direction being temporally separated at a reference plane in said main optical propagation means by a time that is a function of said predetermined separation; and
   means coupled to said optical propagation means for receiving said reflected signals and for providing indications of relative differences between said portions of said light reflected from said mirror means.

2. A fiber optic differential sensor in accordance with claim 1 wherein said receiving means includes:
   detector means for providing, at an output terminal thereof, electrical signals representative of optical signals incident thereto;
   directional coupler means coupled to said main optical propagation means for coupling at least portions of said temporally separated reflected optical signals to said detector means as incident signals thereto, said portions of said temporally separated reflected optical signals establishing a sequence of temporally separated representative electrical signals at said output terminal of said detector means;
   demultiplexing means having a plurality of output terminals and coupled to receive said sequence of representative electrical signals for coupling said representative electrical signals to preselected terminals of said plurality of output terminals in accordance with arrival times in said sequence; and
   means coupled to said plurality of output terminals for comparing said representative signals and for providing indications of relative differences between said portions of said light reflected from said reflecting means.

3. A fiber optic differential sensor in accordance with claims 1 or 2 wherein at least one of said groups of end faces includes three end faces substantially equiangularly positioned with centers of said three end faces on a circle having a center at said center of said group.

4. A fiber optic differential sensor in accordance with claims 1 or 2 wherein at least one of said groups includes four end faces equiangularly positioned with centers of said four end faces on a circle having a center at said center of said group.

5. A fiber optic differential sensor in accordance with claims 1 or 2 wherein said mirror means includes at least one mirror, correspondingly associated with at least one of said groups of end faces, having a first edge with first and second ends and a second edge arcuately extending between said first and second ends, said mirror rotatable about an axis passing through a preselected point on said first edge and said center of said associated group of end faces.

6. A fiber optic differential sensor in accordance with claim 5 wherein said first edge is on a straight line with said preselected point equidistant between said first and second ends and said arcuate second edge is semi-circular with its center at said preselected point.

7. A fiber optic differential sensor in accordance with claim 5 wherein said first edge is on a straight line and said arcuate second edge is a section of an ellipse.

* * * * *